No. 634,151. Patented Oct. 3, 1899.
L. F. STANTON.
AXLE FOR CARRIAGES OR WAGONS.
(Application filed Nov. 12, 1898.)

(No Model.)

Witnesses
Inventor
Lafayette F. Stanton
By J. R. Nottingham
Attorney

United States Patent Office.

LAFAYETTE F. STANTON, OF ONEONTA, NEW YORK.

AXLE FOR CARRIAGES OR WAGONS.

SPECIFICATION forming part of Letters Patent No. 634,151, dated October 3, 1899.

Application filed November 12, 1898. Serial No. 696,279. (No model.)

*To all whom it may concern:*

Be it known that I, LAFAYETTE F. STANTON, a citizen of the United States, residing at Oneonta, in the county of Otsego and State of New York, have invented certain new and useful Improvements in Axles for Carriages and Wagons; and I do hereby declare the following to be a full, clear, and exact description of the invention, such as will enable others skilled in the art to which it appertains to make and use the same.

My invention relates to axles for vehicles, but more particularly to the arms or spindles and the nuts for confining the wheels thereon; and it consists, essentially, in the peculiar construction of the arm or spindle and the confining-nut in connection with the box, whereby the nut is locked against accidental displacement and the wear in said box and upon the arm or spindle is taken up; and the invention further consists of the general arrangement and combination of the several parts, as will be hereinafter more particularly described, and pointed out in the claims.

Figure 1:
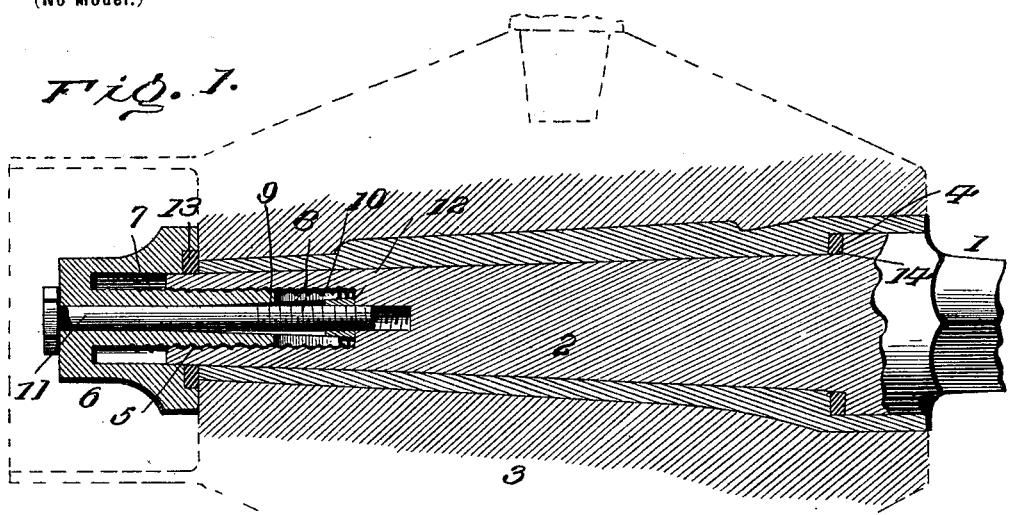
Figure 2:
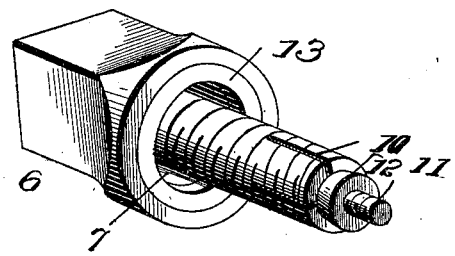
Figure 3:
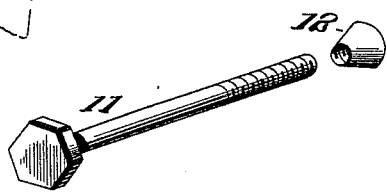

In the accompanying drawings, Figure 1 is a central longitudinal sectional view of one arm or spindle, the hub-box, and confining-nut; Fig. 2, a perspective view of the confining-nut detached, and Fig. 3 a detached view of the drawing-bolt and expanding-cone.

Referring to the several views, the numeral 1 indicates a portion of the axle, 2 the arm or spindle thereof, and 3 the hub-box. The arm or spindle is provided with the usual shoulder 4, and the end is formed with a longitudinal bore 5, preferably screw-threaded, the purpose of which will be hereinafter explained. The inner end of the hub-box is counterbored, so that the box will set over the shoulder of the axle.

The numeral 6 indicates the confining-nut, formed with an annular recess or chamber 7, from which projects a stem or shank 8, preferably screw-threaded externally to adapt it to be screwed into the screw-threaded bore 5 of the arm or spindle of the axle. The stem or shank 8 is provided with a bore 9, which extends through the solid portion of the nut, and the end of said stem is provided with slots 10, so as to permit a slight lateral expansion and contraction of the sides for the purpose hereinafter explained. Seated in the bore 9 is a headed drawing-bolt 11, screw-threaded to receive a screw-threaded expanding-cone 12, which is adapted to be drawn into the slotted end of the projecting stem to expand the same laterally. The inner face or rim of the nut is preferably counterbored or recessed annularly to receive a washer 13, and in the counterbore of the hub-box is seated a washer 14 to prevent end wear on the outer end of the box and shoulder 4, respectively. When the nut is screwed into place, it will be noted that the end of the arm or spindle, which projects slightly beyond the hub-box, extends into the recess or chamber 7 of the nut and as the parts become worn the wear may be taken up by screwing the stem 8 farther into the bore 5 of the axle-arm. When the nut is screwed to its proper position, the drawing-bolt is turned to draw the expanding-cone into the bore of the stem 8. A slight drawing in of the cone-expander will cause the slotted end of the stem 8 to expand laterally, and thus lock the nut against possible movement until the drawing-bolt is unscrewed to loosen the cone.

By this construction of the axle-arm and confining-nut all danger of losing the nut and the wheel running off is prevented and the parts readily and quickly adjusted to take up the wear.

It will be obvious that by my construction the nut will be prevented from becoming accidentally displaced and that all wear, either upon the ends of the box or the shoulder and end of the axle-arm, may be readily taken up by reason of the recess or chamber in the nut, as when wear has been had upon the axle-arm instead of cutting off the end of the arm and cutting thereon new threads I merely tighten or screw up the nut, and by reason of the recess or chamber therein the end of said arm will be forced farther into said recess and accomplish the same result much more expeditiously.

In using my device there is no necessity for a mechanic, as any one can adjust the parts, thereby effecting a great saving in both time and labor.

Having thus fully described my invention, what I claim as new, and desire to secure by Letters Patent, is—

1. The combination with the arm of an axle having a longitudinal screw-threaded bore, of a confining-nut having its inner face recessed to receive a washer, against which the outer end of the box abuts, and an annular chamber to receive the end of the axle-arm, said chamber being of sufficient depth to permit the end of said arm to enter said chamber varying distances to take up the wear of the parts, the said nut having an integral screw-threaded stem adapted to be received in the bore of the axle-arm, and means substantially as described for securing the nut and stem against accidental displacement.

2. The combination with the arm of an axle having a longitudinal screw-threaded bore, of a nut provided with a recess or chamber to receive the end of said arm and having an externally-screw-threaded hollow stem, slotted at the end, said stem adapted to be screwed into the bore of the axle-arm, and means for expanding the slotted end of the stem, so as to lock the nut against accidental displacement.

3. The combination with the arm of an axle having a longitudinal screw-threaded bore, of a chambered or recessed nut provided with an externally-screw-threaded stem, bored longitudinally and slotted at the end, and a drawing-bolt, screw-threaded and carrying an expander-cone, whereby the nut may be locked to the axle-arm against accidental displacement.

In testimony whereof I affix my signature in the presence of two witnesses.

LAFAYETTE F. STANTON.

Witnesses:
GEORGE L. GIBBS,
C. L. WILBUR.